(12) United States Patent
Guo

(10) Patent No.: US 11,611,100 B2
(45) Date of Patent: Mar. 21, 2023

(54) COILED CELL

(71) Applicant: NINGDE AMPEREX TECHNOLOGY LIMITED, Ningde (CN)

(72) Inventor: Yonglin Guo, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 851 days.

(21) Appl. No.: 16/454,883

(22) Filed: Jun. 27, 2019

(65) Prior Publication Data

US 2019/0393540 A1    Dec. 26, 2019

Related U.S. Application Data

(63) Continuation of application No. PCT/CN2017/112319, filed on Nov. 22, 2017.

(51) Int. Cl.
*H01M 10/04* (2006.01)
*H01M 50/538* (2021.01)

(52) U.S. Cl.
CPC ..... *H01M 10/0431* (2013.01); *H01M 50/538* (2021.01)

(58) Field of Classification Search
CPC .............. H01M 10/0431; H01M 10/0587
See application file for complete search history.

(56) References Cited

U.S. PATENT DOCUMENTS

2020/0044225 A1*  2/2020  Eo ............... H01M 10/0587

FOREIGN PATENT DOCUMENTS

| CN | 1770545    A | 5/2006  |
| CN | 106025377  A | 10/2016 |
| CN | 205828550  U | 12/2016 |
| CN | 206451767  U | 8/2017  |
| JP | 2000021452 A | 1/2000  |

OTHER PUBLICATIONS

Ningde Amperex Technology Limited, International Search Report and Written Opinion, PCT/CN2017/112319, dated Feb. 26, 2018, 15 pgs.

* cited by examiner

*Primary Examiner* — Stephan J Essex
(74) *Attorney, Agent, or Firm* — Morgan, Lewis & Bockius LLP

(57) ABSTRACT

A cell (1) includes a flat electrode assembly formed by superposing and winding respective starting ends of a first electrode sheet (10), a first separator (30), a second electrode sheet (20), and a second separator (40). A first electrode tab (50) and a second electrode tab (60) are both located in grooves of the membranes. Respective starting ends of a second outer membrane (202) and a second inner membrane (203) are both aligned with a starting end of the second current collector (201), and a starting end of a first outer membrane (102) is aligned with a starting end of the first current collector (101). A first head section (106) is provided on a surface of the first current collector (101) facing a center of the cell, and a starting end of the first head section (106) is aligned with the first current collector (101).

20 Claims, 4 Drawing Sheets

COILED CELL

CROSS-REFERENCE TO RELATED APPLICATIONS

This application is a continuation application of PCT Patent Application No. PCT/CN2017/112319, filed on Nov. 22, 2017, which claims priority to Chinese Patent Application No. 201621440883.9, filed on Dec. 27, 2016, all of which are hereby incorporated by reference in their entirety.

TECHNICAL FIELD

The present disclosure relates to a technical field of secondary batteries, and more particularly, to a cell.

BACKGROUND

At present, the secondary batteries widely used on the market are all composed of a cell and a casing. The cell is an active component and is generally formed by superposing and winding a positive electrode sheet, a negative electrode sheet, and a separator arranged between the positive electrode sheet and the negative electrode sheet. The positive electrode sheet includes a positive electrode current collector and a positive electrode active material coated on a surface of the positive electrode current collector. The negative electrode sheet includes a negative electrode current collector and a negative electrode active material coated on a surface of the negative electrode current collector.

With the development of commercialization of secondary cells, higher energy density is required. According to the traditional wound structure used in the art, as shown in FIG. 1, an electrode tab is welded to the bare region of the electrode sheet, thereby the tab portion takes up a large proportion of the overall thickness of a cell, and thus the energy density of the cell is seriously reduced.

The present disclosure is proposed in view of the defects in the related art.

SUMMARY

An objective of the present disclosure is to provide a cell.
In order to achieve the objective, the technical solutions are adopted as follows.

The present disclosure relates to a cell. The cell includes a flat electrode assembly formed by superposing and winding a first electrode sheet, a separator, and a second electrode sheet. A first electrode tab is connected to the first electrode sheet, and a second electrode tab is connected to the second electrode sheet. The separator includes a first separator and a second separator.

A first position where the first electrode sheet bends for the first time defines a first bend, and a second position where the first electrode sheet bends for the second time defines a second bend.

The first electrode sheet includes a first current collector, and a first membrane including a first outer membrane and a first inner membrane arranged on opposite surfaces of the first current collector, the first outer membrane being arranged on the first surface of the first current collector facing away from a center of the cell, while the first inner membrane being arranged on the second surface of the first current collector facing the center of the cell.

The second electrode sheet includes a second current collector, and a second membrane including a second outer membrane and a second inner membrane arranged on opposite surfaces of the second current collector, the second outer membrane being arranged on the first surface of the second current collector facing away from the center of the cell, while the second inner membrane being arranged on the second surface of the second current collector facing the center of the cell.

At least one of the second outer membrane and the second inner membrane is provided with a second groove where the second current collector is exposed, the second electrode tab being located in the second groove; at least one of the first outer membrane and the first inner membrane is provided with a first groove where the first current collector is exposed, the first electrode tab being located in the first groove.

The starting end of the second electrode sheet is located between the first bend and the second bend; respective starting ends of the second outer membrane and the second inner membrane are both aligned with a starting end of the second current collector.

A starting end of the first outer membrane is aligned with a starting end of the first current collector; a first head section is provided on the second surface of the first current collector facing the center of the cell, and a starting end of the first head section is aligned with the first current collector.

Preferably, in a thickness direction of the cell, a tail end of the first head section is located around the starting end of the second electrode sheet.

Preferably, a starting end of the first inner membrane is located around the second bend.

Preferably, the first groove is provided on the first outer membrane located between the first bend and the second bend.

Preferably, a position where at least one of the first outer membrane and the first inner membrane bends for the last time defines a tail bend of the first electrode sheet. And, the first groove is provided on at least one of the first outer membrane and the first inner membrane between the second bend and the tail bend of the first electrode sheet.

Preferably, a position where at least one of the first outer membrane and the first inner membrane bends for the last time defines a tail bend of the first electrode sheet, and a tail end of at least one of the first outer membrane and the first inner membrane defines a tail end of the first membrane. The first groove is provided on at least one of the first outer membrane and the first inner membrane between the tail bend of the first electrode sheet and the tail end of the first membrane.

Preferably, in a thickness direction of the flat electrode assembly, not more than two layers of the separator continuously overlap on an innermost side of the cell.

Preferably, a separator tail section consisting of the separator is provided at a tail end of the cell.

Preferably, an outer peripheral surface of the cell is composed of the separator.

Preferably, the second electrode sheet includes a second bare region forming at least a half outermost circle of the cell. And, a portion of the second electrode sheet comprises a second single-sided coated region, the portion of the second electrode sheet faces to a surface of the second bare region facing the center of the cell.

Preferably, the second electrode sheet includes a second bare region forming at least at a half outermost circle of the cell, and a portion of the first electrode sheet includes a first bare region, the portion of the first electrode sheet faces to a surface of the second bare region facing the center of the cell.

Technical solutions of the present disclosure have at least the following beneficial effects.

In the present disclosure, the two electrode tabs are embedded in the grooves of the membranes so to improve the energy density of the cell. Further, the first head section is introduced into the cell, therefor the curl-up of a single-sided area and fall-off of the membrane at a head of the first electrode sheet can be alleviated, and the performance consistency of the cell can be improved.

REFERENCE SIGNS

1—cell;
10—first electrode sheet;
101—first current collector;
102—first outer membrane;
103—first inner membrane;
104—first bend;
105—second bend;
106—first head section;
107—tail bend of first electrode sheet;
108—first bare region;
20—second electrode sheet;
201—second current collector;
202—second outer membrane;
203—second inner membrane;
204—second bare region;
205—second single-sided coated area;
30—first separator;
40—second separator;
50—first electrode tab;
60—second electrode tab;
70—separator tail section.

DETAILED DESCRIPTION

The present disclosure will be further illustrated below with reference to specific embodiments. It should be understood that these embodiments are only used to explain the present disclosure rather than limit the scope of the present disclosure.

Figure 1:
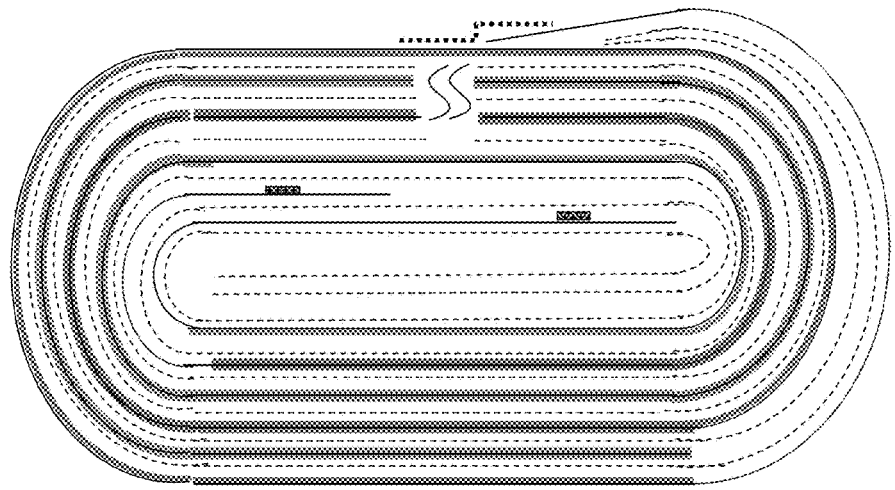
FIG. 1 is a structural schematic diagram of a cell in the related art.
Figure 2:
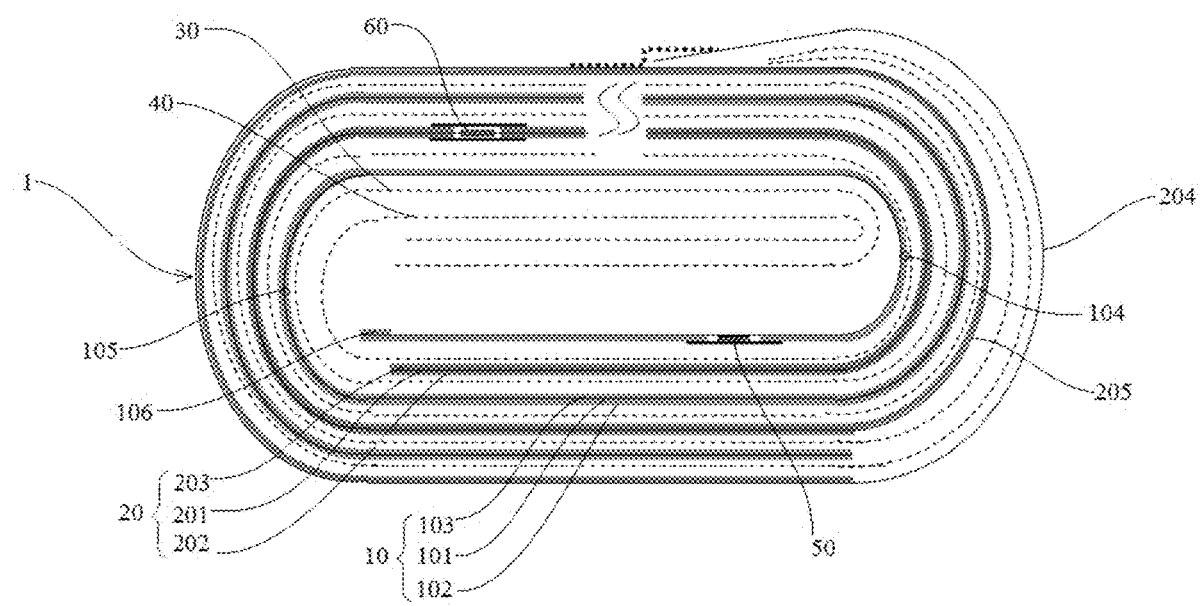
FIG. 2 is a structural schematic diagram of a cell according to a specific embodiment of the present disclosure.

The present disclosure relates to a cell 1. As shown in FIG. 2, the cell 1 includes a flat electrode assembly formed by superposing and winding a first electrode sheet 10, a first separator 30, a second electrode sheet 20 and a second separator 40 from starting ends thereof. A first electrode tab 50 is connected to the first electrode sheet 10, and a second electrode tab 60 is connected to the second electrode sheet 20. A position where the first electrode sheet 10 bends for the first time defines a first bend 104, and a position where the first electrode sheet 10 bends for the second time defines a second bend 105.

The first electrode sheet 10 includes a first current collector 101, and a first outer membrane 102 and a first inner membrane 103 which are arranged on opposite surfaces of the first current collector 101. The first outer membrane 102 is arranged on the first surface of the first current collector facing away from a center of the cell, and the first inner membrane 103 is arranged on the second surface of the first current collector facing the center of the cell. A first groove (not shown) exposing a blank current collector is provided in the first outer membrane 102 and/or the first inner membrane 103, the first electrode tab 50 being located in the first groove.

The second electrode sheet 20 includes a second current collector 201, and a second outer membrane 202 and a second inner membrane 203 which are arranged on opposite surfaces of the second current collector 201. The second outer membrane 202 is arranged on the first surface of the second current collector facing away from the center of the cell, and the second inner membrane 203 is arranged on the second surface of the second current collector facing the center of the cell. A second groove (not shown) exposing a blank current collector is provided in the second outer membrane 202 and/or the second inner membrane 203, the second electrode tab 60 being located in the second groove.

In the present disclosure, the two electrode tabs are embedded in the grooves of the membranes, thus improving the energy density of the cell.

In the embodiments of the present disclosure, respective starting ends of the second outer membrane 202 and the second inner membrane 203 are both aligned with a starting end of the second current collector 201, so as to maximize the energy density of the cell and reduce burrs.

In the embodiments of the present disclosure, the starting end of the second electrode sheet 20 is located between the first bend 104 and the second bend 105.

A starting end of the first outer membrane 102 is aligned with a starting end of the first current collector 101. A first head section 106 is provided on a surface of the first current collector 101 facing the center of the cell, and has a starting end aligned with the first current collector 101. In such a way, a double-sided membrane area is formed at a head of the first current collector 101, thereby alleviating curl-up of a single-sided area and fall-off of the membrane at the head of the first electrode sheet 10, and improving the performance consistency of the cell. Preferably, the first head section 106 can be prepared from an active material of the first electrode sheet, or can be prepared from other inert materials that do not react with the cell material.

In the embodiments of the present disclosure, in a thickness direction of the cell, a tail end of the first head section 106 is located around the starting end of the second electrode sheet 20 and is preferably aligned with the starting end of the second electrode sheet 20, such that the thickness of the cell will not be increased and the energy density of the cell will not be affected.

In the embodiments of the present disclosure, a starting end of the first inner membrane 103 is located around the second bend 105. The head of the first electrode sheet 10 in the present disclosure is coated on one side, and the single-sided coated area is located at the innermost side of the cell.

Figure 3:
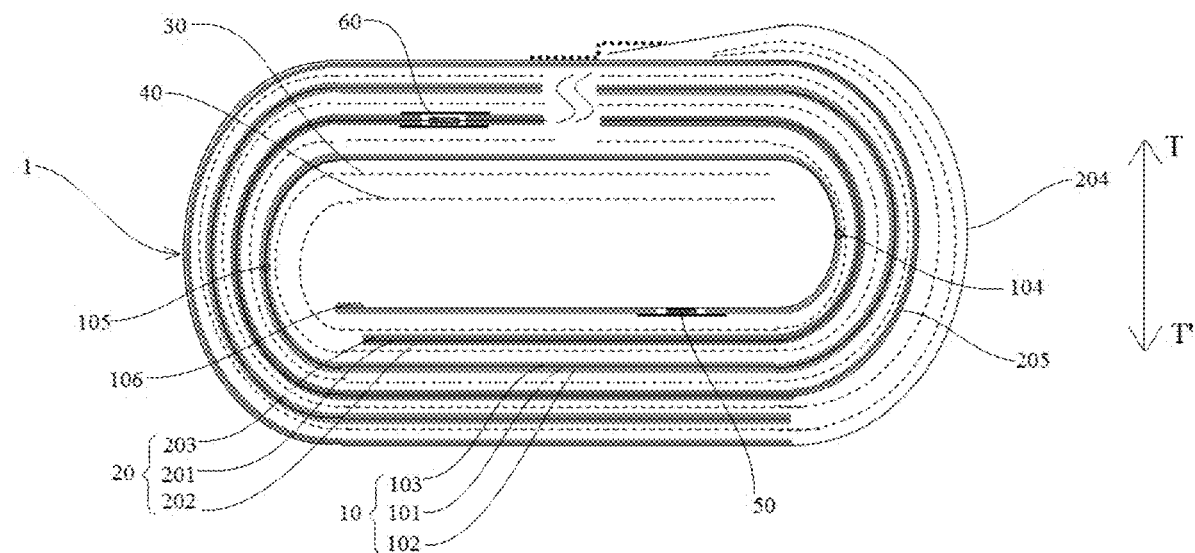
FIG. 3 is a structural schematic diagram of a cell according to a specific embodiment of the present disclosure.

In the embodiments of the present disclosure, as shown in FIGS. 2 and 3, the first electrode tab 50 can be located at the head of the first electrode sheet 10, thereby reducing polarization to a certain extent. A first groove (not shown) exposing a blank current collector is provided in the first outer membrane 102 between the first bend 104 and the second bend 105, and the first electrode tab 50 is located in the first groove.

Figure 4:
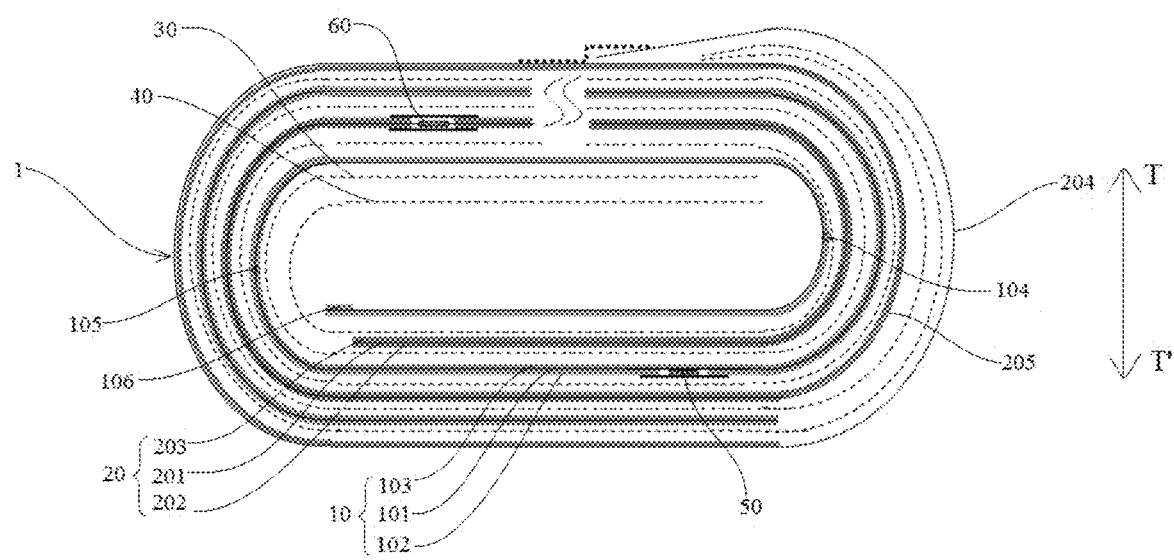
FIG. 4 is a structural schematic diagram of a cell according to a specific embodiment of the present disclosure.

In the embodiments of the present disclosure, as shown in FIG. 4, the first electrode tab 50 can be located in the middle portion of the first electrode sheet 10, thereby reducing polarization to a certain extent. Specifically, a position where the first inner membrane 103 bends for the last time defines a tail bend 107 of the first electrode sheet. A first groove exposing a blank current collector is provided in the first outer membrane 102 between the second bend 105 and the tail bend 107 of the first electrode sheet, and the first electrode tab 50 is located in the first groove (not shown). Similarly, the first inner membrane 103 can be provided with a groove exposing a blank current collector.

Figure 5:
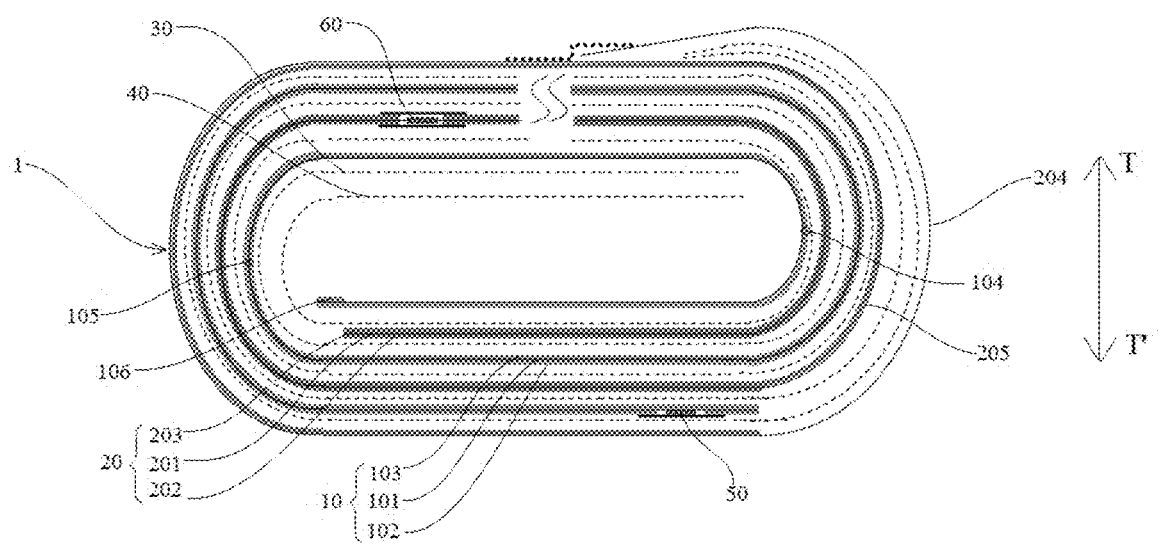
FIG. 5 is a structural schematic diagram of a cell according to a specific embodiment of the present disclosure.

In the embodiments of the present disclosure, as shown in FIG. 5, the first electrode tab 50 can be located at a tail of the first electrode sheet 10, thereby reducing polarization to a certain extent. A position where the first outer inner membrane 103 bends for the last time defines a tail bend 107 of the first electrode sheet, and a tail end of the first inner membrane 103 is a tail end of a first membrane. From the tail bend 107 of the first electrode sheet to the tail end of the first membrane, the first outer membrane 102 is provided with a first groove exposing a blank current collector, and the first electrode tab 50 is located in the first groove (not shown). Similarly, the first inner membrane 103 can be provided with a groove exposing a blank current collector.

In the embodiments of the present disclosure, as shown in FIGS. 3 to 5, in a thickness direction (T-T' direction) of the flat electrode assembly, not more than two layers of the first separator 30 and the second separator 40 continuously overlapped on the innermost side of the cell. Thus, the thickness of the cell is further reduced, and the energy density of the cell is further improved.

Figure 6:
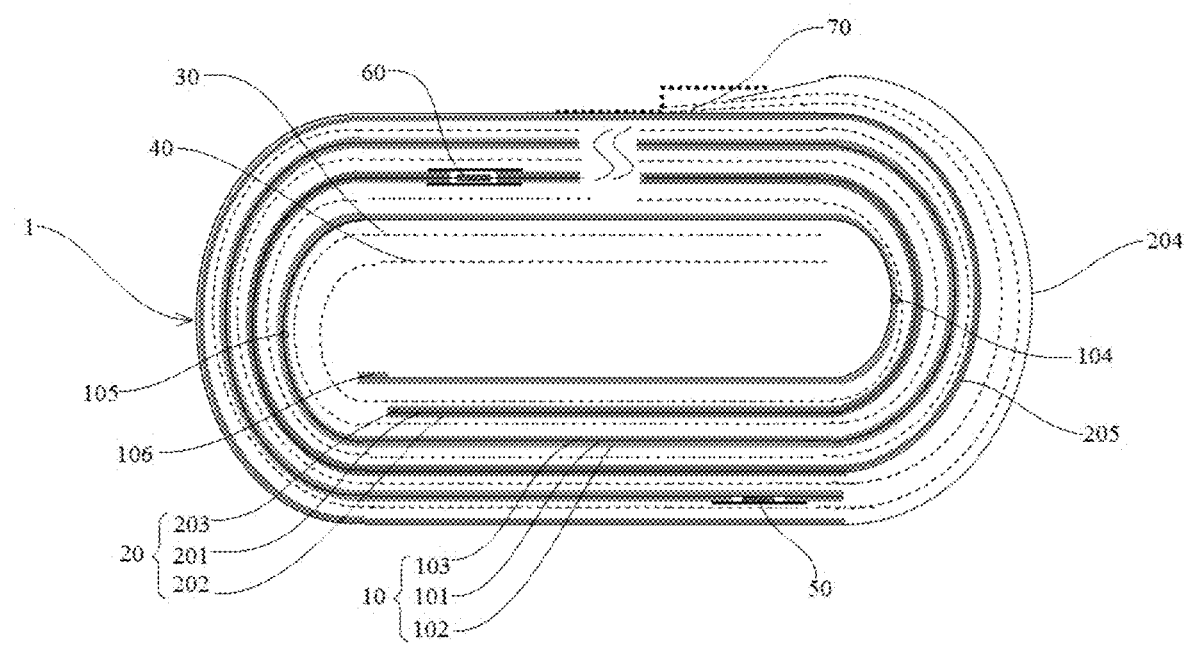
FIG. 6 is a structural schematic diagram of a cell according to a specific embodiment of the present disclosure.

In the embodiments of the present disclosure, in order to enhance adhesion between a cell and a packaging bag and improve the anti-dropping performance, a tail end of the cell 1 is provided with a separator tail section 70 only consisting of the first separator 30 and the second separator 40, as shown in FIG. 6, thereby increasing the friction between an outer side of the cell and the packaging bag to improve the anti-dropping performance of the battery. The separator tail section 70 can be composed of the first separator 30 or the second separator 40.

Figure 7:
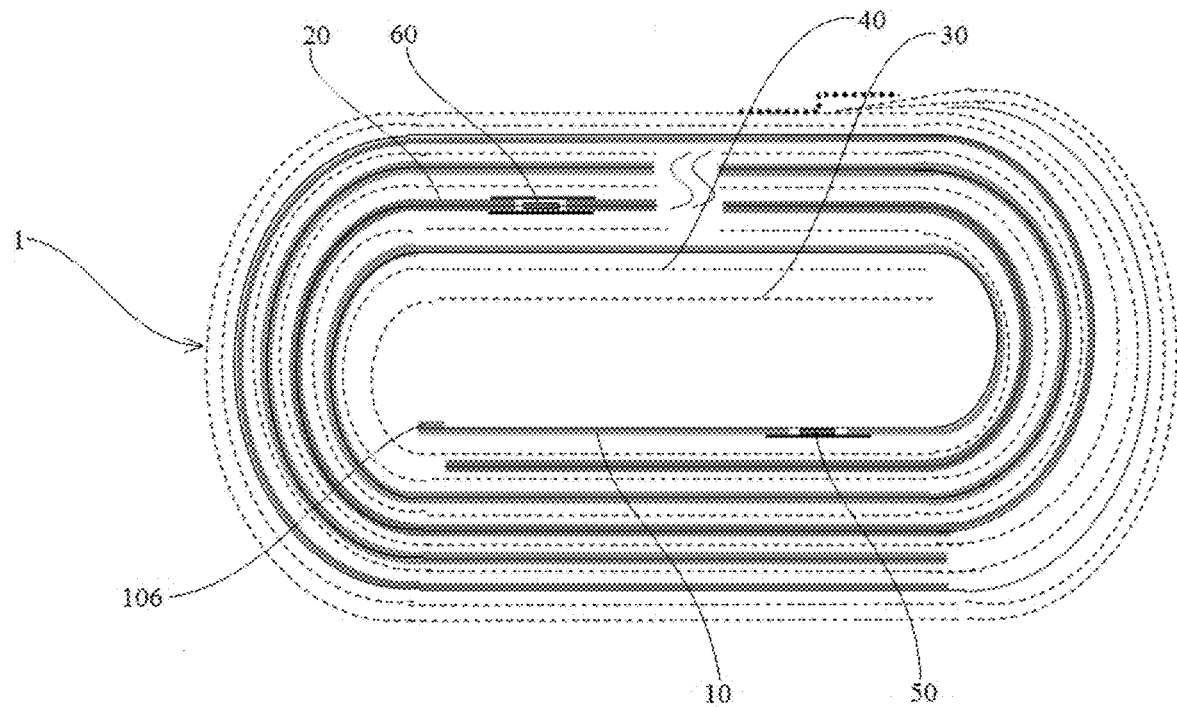
FIG. 7 is a structural schematic diagram of a cell according to a specific embodiment of the present disclosure.

In the embodiments of the present disclosure, as shown in FIG. 7, in order to further improve the adhesion between the cell and the packaging bag, an outer peripheral surface of the cell is composed of the first separator 30 and the second separator 40, thereby maximizing the friction between the outer side of the cell and the packaging bag to enhance the anti-dropping performance of the battery. The outer peripheral surface of the cell can be composed of the first separator 30 or the second separator 40.

In the embodiments of the present disclosure, as shown in FIGS. 2 to 6, in order to improve the anti-abuse performance of the cell, the second electrode sheet 20 is configured to include a second bare region 204 forming at least at a half outermost circle of the cell, and a part of the second electrode sheet 20 directly faces a surface of the second bare region 204 facing the center of the cell includes a second single-sided coated area 205. In the thickness direction of the cell, a tail end of the first electrode sheet 10 is substantially aligned with a starting point of the second bare region 204 on the second electrode sheet 20. That is, a protection structure is formed by the second bare region 204 and the second single-sided coated area 205 on the second electrode sheet 20. The second bare region 204 can surround the cell for half a circle, thereby forming a protection structure on one side in the thickness direction of the cell, or can surround the cell for a whole circle, thus forming the protection structure on both sides in the thickness direction of the cell. When the cell is subject to abuse situations, the protection structure can be preferentially short-circuited to avoid safety problems such as combustion or explosion, thereby improving the safety performance of the cell.

Figure 8:
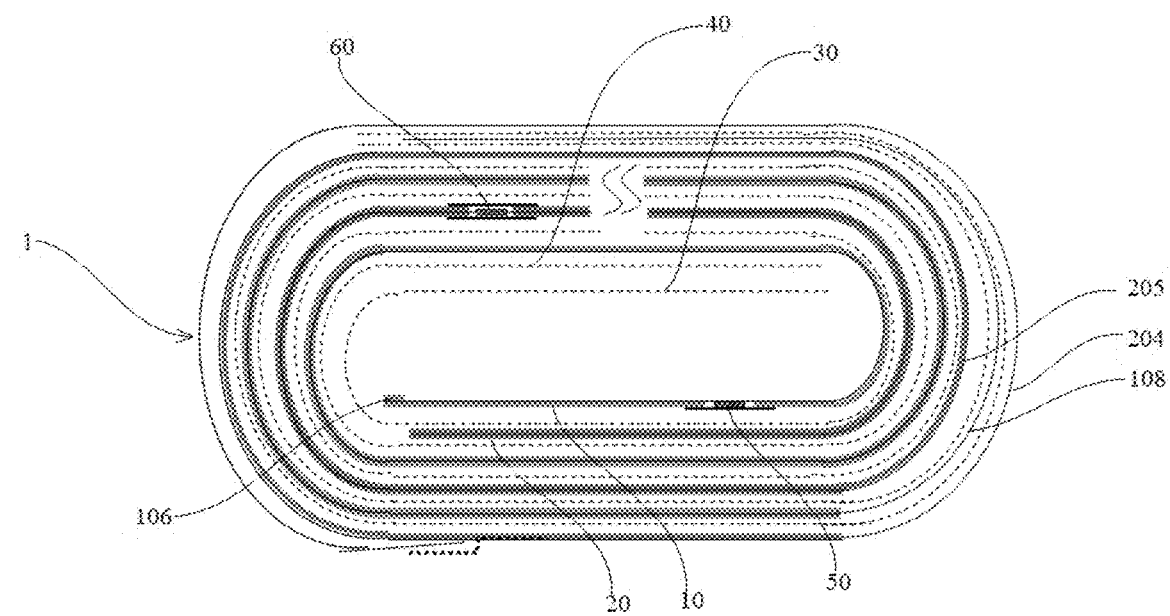
FIG. 8 is a structural schematic diagram of a cell according to a specific embodiment of the present disclosure.

In the embodiments of the present disclosure, as shown in FIG. 8, in order to improve the anti-abuse performance of the cell, the second electrode sheet 20 is configured as a second bare region 204 at least at a part thereof located at the outermost half circle of the cell, and a part of the first electrode sheet 10 directly opposite to a surface of the second bare region 204 facing the center of the cell includes a first bare region 108. That is, a protection structure is formed by an uncoated region on the second electrode sheet 20 and a bare region on the first electrode sheet 10. Similarly, the second bare region 204 can surround the cell for half a circle, thereby forming a protection structure on one side in the thickness direction of the cell, or can surround the cell for a whole circle, thus forming the protection structure on both sides in the thickness direction of the cell.

When the protection structure are formed on opposite sides of the thickness direction of the cell, the thickness of curled parts on both sides of the cell is balanced, thereby obtaining the better flatness of the cell, and improving the deformation of the cell.

Further preferably, in the embodiments of the present disclosure, the electrode tab can be integrally formed with the current collector, and for example, the electrode tab can be directly cut from the current collector. Alternatively, the electrode tab can be formed separately and fixed to the corresponding bare portion of the current collector. According to an embodiment of the present disclosure, the electrode tab can be fixed to the bare portion of current collector at the groove of the electrode sheet. Further preferably, after welding, the first electrode tab 50 and the first current collector 101 has a maximum thickness of less than or equal to 1.5 times of the total thickness of the first electrode tab 50 and the first current collector 101; and/or, after welding, the second electrode tab 60 and the second current collector 201 has a maximum thickness of less than or equal to 1.5 times of the total thickness of the second electrode tab 60 and the second current collector 201, such that the electrode tab assembly has an appropriate thickness, and thus the defect of excessive welding resistance caused by excessive thickness of the electrode tab structure is avoided, the internal symmetry of the cell is improved, the reliability of the electrode tab structure is improved, thereby avoiding deformation, and upgrading the overall performance of the battery.

According to an embodiment of the present disclosure, the first electrode sheet 10 can be a cathode electrode sheet and the second electrode sheet 20 can be an anode electrode sheet. According to an embodiment of the present disclosure, the first electrode sheet 10 can be an anode electrode sheet and the second electrode sheet 20 can be a cathode electrode sheet. Preferably, the first electrode sheet 10 can be an anode electrode sheet.

Although the present disclosure is disclosed by way of the preferred embodiments, the claims shall not be limited thereto. Any possible variations and modification can be made without departing from the concept of the present disclosure. The protection scope of the present disclosure should be defined by the claims.

What is claimed is:

1. A cell, comprising a flat electrode assembly formed by superposing and winding a first electrode sheet, a separator, and a second electrode sheet from starting ends thereof, a first electrode tab being connected to the first electrode sheet, and a second electrode tab being connected to the second electrode sheet;
wherein the separator comprises a first separator and a second separator;
wherein a first position where the first electrode sheet bends for the first time defines a first bend, and a second position where the first electrode sheet bends for the second time defines a second bend;
the first electrode sheet comprises a first current collector, and a first membrane comprising a first outer membrane and a first inner membrane arranged on opposite surfaces of the first current collector, the first outer membrane being arranged on a first surface of the first current collector facing away from a center of the cell, the first inner membrane being arranged on a second surface of the first current collector facing the center of the cell;
the second electrode sheet comprises a second current collector, and a second membrane comprising a second outer membrane and a second inner membrane arranged on opposite surfaces of the second current collector, the second outer membrane being arranged on a first surface of the second current collector facing away from the center of the cell, the second inner membrane being arranged on a second surface of the second current collector facing the center of the cell;
at least one of the second outer membrane and the second inner membrane is provided with a second groove where the second current collector is exposed, the second electrode tab being located in the second groove;
at least one of the first outer membrane and the first inner membrane is provided with a first groove where the first current collector is exposed, the first electrode tab being located in the first groove;
the starting end of the second electrode sheet is located between the first bend and the second bend;
respective starting ends of the second outer membrane and the second inner membrane are both aligned with a starting end of the second current collector;
a starting end of the first outer membrane is aligned with a starting end of the first current collector; and
a first head section is provided on the second surface of the first current collector facing the center of the cell, the first head section including a starting end and a tail end positioned along a winding direction of the cell, wherein:
the starting end of the first head section is aligned with the starting end of the first current collector;
the tail end of the first head section is aligned with the starting end of the second electrode sheet; and
there is an offset between the starting end of the first current collector and the starting end of the second current collector defined by the starting end of the first head section and the tail end of the first head section along the winding direction of the cell.

2. The cell according to claim 1, wherein the tail end of the first head section is aligned with the starting end of the second electrode sheet in a thickness direction of the cell.

3. The cell according to claim 1, wherein a starting end of the first inner membrane is adjacent to the second bend.

4. The cell according to claim 1, wherein the first groove is provided on the first outer membrane located between the first bend and the second bend.

5. The cell according to claim 1, wherein a position where at least one of the first outer membrane and the first inner membrane bends for the last time defines a tail bend of the first electrode sheet;
wherein the first groove is provided on at least one of the first outer membrane and the first inner membrane between the second bend and the tail bend of the first electrode sheet.

6. The cell according to claim 1, wherein a position where at least one of the first outer membrane and the first inner membrane bends for the last time defines a tail bend of the first electrode sheet, and a tail end of at least one of the first outer membrane and the first inner membrane defines a tail end of the first membrane;
wherein the first groove is provided on at least one of the first outer membrane and the first inner membrane between the tail bend of the first electrode sheet and the tail end of the first membrane.

7. The cell according to claim 1, wherein in a thickness direction of the flat electrode assembly, not more than two layers of the separator continuously overlap on an innermost side of the cell.

8. The cell according to claim 1, wherein a separator tail section consisting of the separator is provided at a tail end of the cell.

9. The cell according to claim 1, wherein an outer peripheral surface of the cell is composed of the separator.

10. The cell according to claim 1, wherein the second electrode sheet comprises a second bare region forming at least a half outermost circle of the cell; and
a portion of the second electrode sheet comprises a second single-sided coated region, the portion of the second electrode sheet facing towards a surface of the second bare region facing the center of the cell.

11. The cell according to claim 1, wherein the second electrode sheet comprises a second bare region forming at least a half outermost circle of the cell; and
a portion of the first electrode sheet comprises a first bare region, the portion of the first electrode sheet facing towards a surface of the second bare region facing the center of the cell.

12. The cell according to claim 1, wherein a separator tail section only consisting of the first separator or the second separator is provided at a tail end of the cell.

13. The cell according to claim 1, wherein an outer peripheral surface of the cell is composed of the first separator or the second separator.

14. The cell according to claim 1, wherein the first electrode tab and the second electrode tab are embedded in the grooves of the membranes.

15. The cell according to claim 2, wherein the tail end of the first head section is aligned with the starting end of the second electrode sheet.

16. The cell according to claim 10, wherein in a thickness direction of the cell, a tail end of the first electrode sheet is substantially aligned with a starting point of the second bare region on the second electrode sheet.

17. The cell according to claim 10, wherein the second bare region and the second single-sided coated area on the second electrode sheet form a protection structure.

18. The cell according to claim 10, wherein the second bare region surrounds the cell for half a circle to form a protection structure on one side in a thickness direction of the cell.

19. The cell according to claim 10, wherein the second bare region surrounds the cell for a whole circle to form a protection structure on both sides in a thickness direction of the cell.

20. The cell according to claim 11, wherein the second bare region on the second electrode sheet and the first bare region on the first electrode sheet form a protection structure.

\* \* \* \* \*